Figure 1:
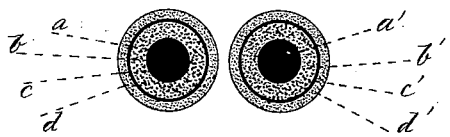

(No Model.)

S. F. SHELBOURNE.
PROTECTING ELECTRIC CONDUCTORS FROM INDUCTION.

No. 297,184. Patented Apr. 22, 1884.

WITNESSES
Wm. A. Lowe
Oliver M. Earle

INVENTOR
Sidney F. Shelbourne

UNITED STATES PATENT OFFICE.

SIDNEY F. SHELBOURNE, OF NEW YORK, N. Y.

PROTECTING ELECTRIC CONDUCTORS FROM INDUCTION.

SPECIFICATION forming part of Letters Patent No. 297,184, dated April 22, 1884.

Application filed December 11, 1883. (No model.)

*To all whom it may concern:*

Be it known that I, SIDNEY F. SHELBOURNE, a citizen of the United States, residing in the city of New York, and State of New York, have invented a new and useful Improvement in Protecting Electric Conductors from Induction, of which the following is a true and exact declaration and description.

Various means have hitherto been adopted to prevent the effects of induction between parallel electric wires in close proximity to each other. These means have varied according to the different ideas of inventors, as to the causes and manifestations of induction. In the patent to Faucaut a surrounding of tinfoil or a thin-wire conductor, wound in very long turns, with the idea of receiving the induction-current and carrying it off to earth, as though it were a leakage of electricity, is described. Various modifications of this device have been adopted, as shown in the patents to Chinnock, Pearson, and others. In all these patents the essential idea has been the earth-connection. Where tin-foil coatings have been adopted in practice, all the coatings of all the conductors have been in metallic contact with each other laterally and with the ground as freely and at as many points as possible. This method has made the multiplied coatings an extensive condenser, and although kinetic effects as between the conductors have been in some measure prevented, proportioned to the conductivity of the tin-foil as compared with better conductive interposed media, yet the free contact with earth has resulted in a greatly-increased and fatal retardation when telephonic communication is considered. While a completely-inclosing conductive material about the insulation of a conductor, with certain other provisions, is a progress in the direction of a true science, other devices, which assume the near presence merely of a conducting-wire as an efficient induction preventive, have not been neglected. Cables are thus produced with wires located within them, and connected at each end with the earth, or making, in theoretic cases, a metallic circuit exterior to the cable. The experiments of Professor Henry demonstrated that dynamic induction could be largely prevented between powerful coils of copper ribbon by the interposition between them of a third similar coil, but only when the ends of the third coil were connected together. Other experiments in England and this country have shown that static charge, and consequent retardation, is at least four times as great when a conductive medium surrounding the insulation of a conductor is in conduction with the earth.

Taking into view the facts just explained, the present invention has for its object to overcome the difficulties involved, in the following manner: Each conductor is first insulated. It then is covered with an inclosure of very thin copper, put on spirally in strips, in the same manner as taping. Another wrapping or coating of insulation is then added over the thin copper. The conductors thus prepared are then formed into cables, either parallel to each other or in strands and spirals, as is shown in the several applications heretofore made by me. The cable may be supposed to contain from two to a hundred or more of such conductors. At the ends of such cable, or of a series of such cables in line for operation, the thin copper coverings of any two conductors are connected together electrically, thus forming a complete induction-circuit for each of those two conductors by the employment of the induction-shield, the shield of one conductor cooperating with that of the other for that purpose.

Figure 2:
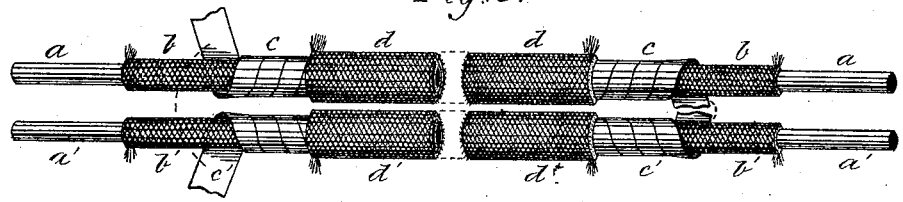
Figure 3:
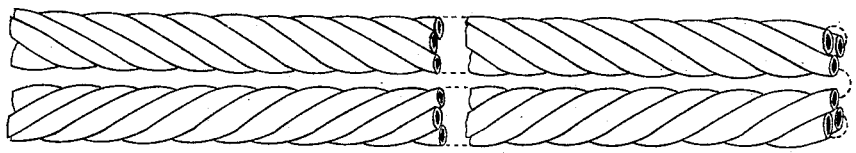
Figure 4:
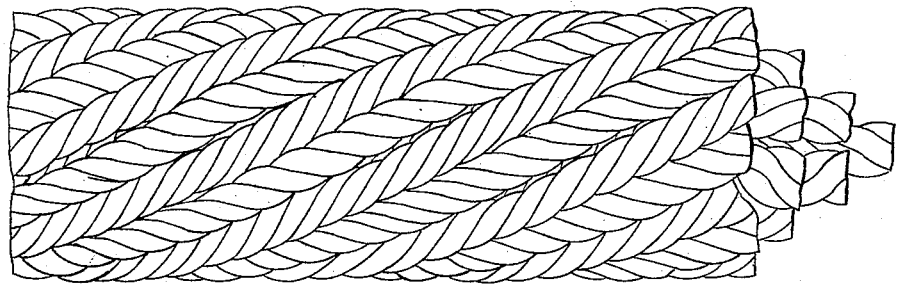

The several features mentioned are illustrated in the drawings, in which Figure 1 is a section of two adjacent conductors, and Fig. 2 a longitudinal perspective view of the same. Fig. 3 shows right and left spiraled strands of such conductors, wherein the connections of their induction-circuits are indicated by the dotted lines at the right-hand margin of the drawings, while Fig. 4 presents a cable of a large number of strands, such as shown in Fig. 3, and arranged spirally in circumferential series about each other. The scope and principle of the invention is, however, entirely illustrated in Figs. 1 and 2.

Reverting to Fig. 1, $a$ and $a'$ are the two conductors; $b$ and $b'$, their insulations; $c$ and $c'$, the inclosing thin copper induction-covering, and $d$ and $d'$ the completing or outer insulation. These same letters of reference will apply to the explanation of Fig. 2. The connections of the thin copper coverings, to form the completed metallic induction-circuits for the pairs of conductors, are indicated by the dotted curved lines at the right and left of Fig. 2, representing, respectively, the remote ends of the cable or line of cables, so far as this particular pair of conductors may be continued in it to reach the signal-instruments with which they are connected.

It is obvious that it will not vary the principle involved if the circuit of a pair for the induced currents is made more than once in the extent of the length of that pair—i. e., if the said circuit is made at the ends of the sections or divisions of the line of an underground cable—although the pair may continue through any number of these divisions; nor, moreover, will it make any difference if the pair of conductors whose induction-shields form the induction-circuit are not identically and continuously the same throughout the whole line of cable, composed of several or many sections or divisions. The chief facts of importance in this invention are that the induction-shields are not led to the earth, thus avoiding, in a great measure, retardation; that they are insulated laterally, thus dividing by the numbers of conductors the effects of making their induction-coatings a multiplex condenser, and also removing dynamic induction in telephone communication to the quinary degree, except between the pair in circuit relation, which have to each other the quaternary degree; and, thirdly, the realization of simplicity and economy in arranging completed induction-circuits within the cable by instituting the induction-shield of one conductor to assume a partnership with that of its neighbor in supplying the necessary requirement of such a circuit in the absence of an earth-connection.

It is of course understood that where the induction-circuit comprises the whole extent of the pair of conductors, and these extend through several or many cable-sections of an underground line, the induction-shields of such conductors are connected with each other electrically across the divisional test or connection boxes in like manner as their inclosed conductors.

In a previous application I have described and claimed induction-shield circuits within a cable where such induction-shields composing the circuit by electrical connection at their ends were situated annularly, the one within the other. In the present invention each conductor has about its insulation but one shield, which, however, being also covered with insulation, is capable of composing a pair, forming a circuit with the like insulated induction-shield of its neighboring wire, so that the induction-shields, as described herein, are all relatively exterior to each other.

It is also to be observed that where the cable-line is composed of a number of cable-sections by the connection of the wires of the sections across test or junction boxes, as in underground lines, or at buildings or connecting-points above ground, the electrical connection of the induction-shields, forming circuits of pairs, as herein described, may be considerably varied—as, for instance, one of the wires whose induction-shield is paired with that of its neighbor may be required to be diverted from the cable for use in connection with an instrument at a less distance than its paired neighbor. In such case its neighbor beyond that point would have its induction-shield paired with that of a third wire, so that the system, when considered in its full linear extent, would form a limited group of paired induction-shields. Such a case would also present the conditions where the induction-shield of the continuing wire of the first pair will have protected (by joining a circuit with its shield) the first conductor, taken out of the cable to its whole length, or in whole, while it would perform a like function for the third conductor, with whose shield its own should thence onward be connected only in part.

What is claimed as new is—

1. In electric cables in which the conductors have metallic induction-shields surrounding their insulation, an additional or outer insulation for each of such induction-shields, in combination with the electrical connection of such induction-shields in pairs at the ends of the cable-section or line of cables, substantially as and for the purpose set forth.

2. The combination of insulated induction-shields relatively exterior, in pairs or limited groups, with each other, said shields being connected at the ends of an electric cable or line of cable-sections, forming completed metallic induction-circuits within such cable or line of cable-sections and insulated from the earth, substantially as described.

3. In electric cables composed of two or more sections, the combination of the conductors with each other in pairs, said conductors being united by the electrical connection of their induction-shields at the junction of the sections, so that the induction-shield of one may serve, in whole or part, for protecting one or more other conductors in the same cable, each induction-shield in such manner forming one of a pair in circuit, and connected in succession linearly with linear portions of the shield of one or more other conductors within the cable, substantially as set forth.

4. Two or more insulated conductors with insulated induction-shields, said shields being electrically united at their ends in pairs in a line of cable-sections, the shields forming a closed metallic induction-circuit, or linear succession of such circuits, between the conductors, as and for the purpose set forth.

SIDNEY F. SHELBOURNE.

Witnesses:
WM. A. LOWE,
OLIVER M. EARLS.